US005583608A

United States Patent [19]

Nomura et al.

[11] Patent Number: 5,583,608

[45] Date of Patent: Dec. 10, 1996

[54] CONDENSATION PREVENTING STRUCTURE FOR CROSSOVER RACK

[75] Inventors: Kouki Nomura, Aichi-ken; Hiroyuki Satoh, Kanagawa, both of Japan

[73] Assignee: Fuji Photo Film Co., Ltd., Kanagawa, Japan

[21] Appl. No.: 447,690

[22] Filed: May 23, 1995

[30] Foreign Application Priority Data

Sep. 5, 1994 [JP] Japan .................................... 6-210975
Sep. 5, 1994 [JP] Japan .................................... 6-210976

[51] Int. Cl.$^{6}$ .............................. G03B 27/52; G03D 3/08

[52] U.S. Cl. ............................ 355/30; 219/216; 396/572; 396/619; 396/620; 396/624

[58] Field of Search ................................. 355/30, 27, 28; 219/216; 354/298, 319, 321

[56] References Cited

U.S. PATENT DOCUMENTS 4,405,227 9/1983 Inoue et al. ............................... 355/27
4,727,394 2/1988 Bov, Jr. et al. ............................. 355/3
4,731,631 3/1988 Monkelbann et al. ....................... 355/3
5,307,107 4/1994 Nozawa et al. .......................... 354/324
5,379,085 1/1995 Matsuda et al. ......................... 354/319
5,394,216 2/1995 Suzuki et al. ............................ 354/324

*Primary Examiner*—Arthur T. Grimley
*Assistant Examiner*—Herbert V. Kerner
*Attorney, Agent, or Firm*—Sughrue, Mion, Zinn, Macpeak & Seas

[57] ABSTRACT

A condensation preventing structure for a crossover rack provided in a printer processor. The structure has a plurality of conveying rollers provided at a crossover rack provided within a printer processor, and a moisture adhesion prevention/moisture removing device which effects one of prevention of adhesion of moisture to the plurality of conveying rollers due to condensation and removal of moisture on the plurality of conveying rollers due to condensation. Due to the moisture adhesion prevention/moisture removing device, uneven development of a photographic printing paper caused by moisture adhering to the plurality of conveying rollers due to condensation does not occur.

20 Claims, 6 Drawing Sheets

CONDENSATION PREVENTING STRUCTURE FOR CROSSOVER RACK

BACKGROUND OF THE INVENTION

1. Field of the Invention

The present invention relates to a condensation preventing structure for a crossover rack, and in particular, to a condensation preventing structure for a crossover rack provided in a printer processor.

2. Description of the Related Art

In a printer processor, developing solution is accumulated in a developing tank in a processor section. A photographic printing paper is immersed in the developing solution so that developing processing is effected. The photographic printing paper which has been subject to developing processing is conveyed to a bleaching/fixing tank adjacent to the developing tank. Bleaching/fixing solution is accumulated in the bleaching/fixing tank. The photographic printing paper is immersed in the bleaching/fixing solution so that bleaching processing and fixing processing are effected. The photographic printing paper which has been subject to fixing processing is conveyed to a washing section which is adjacent to the bleaching/fixing tank and which comprises a plurality of washing tanks in each of which washing water is accumulated. The photographic printing paper is immersed in the washing water in the washing tanks so that washing processing is effected. A crossover rack is provided at each of the developing tank, bleaching/fixing tank and washing tanks. The photographic printing paper is successively conveyed to the adjacent processing section by the crossover racks.

However, because the crossover racks are disposed at the upper portions of the respective processing tanks, the moisture which evaporates from the processing tanks at night condenses on the conveying rollers of the crossover racks. In particular, when the processor section is a closed-type section, a large amount of moisture condenses on the rollers. Therefore, the exposed paper contacts the condensed droplets before being immersed in the developing solution, and it is easy for uneven development to occur.

SUMMARY OF THE INVENTION

In view of the aforementioned, an object of the present invention is to provide a condensation preventing structure for a crossover rack in which condensation on conveying rollers of a crossover rack can be prevented.

Another object of the present invention is to provide a condensation preventing structure for a crossover rack in which moisture which has condensed on conveying rollers of a crossover rack, especially the crossover rack at the entrance to a developing tank, is removed before an exposed photographic printing paper is conveyed.

A first aspect of the present invention is a condensation preventing structure for a crossover rack provided in a printer processor, comprising: a plurality of conveying rollers provided at a crossover rack provided within a printer processor; and a moisture adhesion prevention/moisture removing device which effects one of prevention of adhesion of moisture to the plurality of conveying rollers due to condensation and removal of moisture on the plurality of conveying rollers due to condensation.

A second aspect of the present invention is a condensation preventing structure for a crossover rack provided in a printer processor, comprising: a plurality of conveying rollers provided at a crossover rack provided within a printer processor; and a drying section provided within the printer processor and preventing condensation on the plurality of conveying rollers by heat generated at the drying section.

A third aspect of the present invention is a condensation preventing structure for a crossover rack in which the second aspect of the present invention further comprises a control device which permits driving of the drying section at all times.

A fourth aspect of the present invention is a condensation preventing structure for a crossover rack provided in a printer processor, comprising: a plurality of conveying rollers provided at a crossover rack provided within a printer processor; a moisture removing device which removes moisture due to condensation on the plurality of conveying rollers; and a control device which, before an exposed photographic printing paper is conveyed, drives the plurality of conveying rollers for a fixed period of time.

In accordance with the first aspect of the invention, due to the moisture adhesion prevention/moisture removing device, there is no uneven development of a photographic printing paper caused by moisture adhering to the plurality of conveying rollers due to condensation.

In the condensation preventing structure for a crossover rack of the second aspect of the present invention, condensation on the conveying rollers can be prevented by heat generated by the drying section.

In the condensation preventing structure for a crossover rack of the third aspect of the present invention, due to the control device, the drying section can be driven at all times. Therefore, condensation on the conveying rollers can be prevented by the heat of the drying section when the printer processor is in either an operating state or a non-operating state (standby state).

In the condensation preventing structure for a crossover rack of the fourth aspect of the present invention, before the exposed photographic printing paper is conveyed by the conveying rollers, the crossover rack is driven for a fixed period of time by the control device. Therefore, the moisture which has condensed on the conveying rollers can be removed, before the exposed photographic printing paper is conveyed, by the moisture removing device which contacts the conveying rollers.

DESCRIPTION OF THE PREFERRED EMBODIMENTS

An embodiment of the present invention will be described in accordance with FIGS. 1 through 3.

Figure 1:
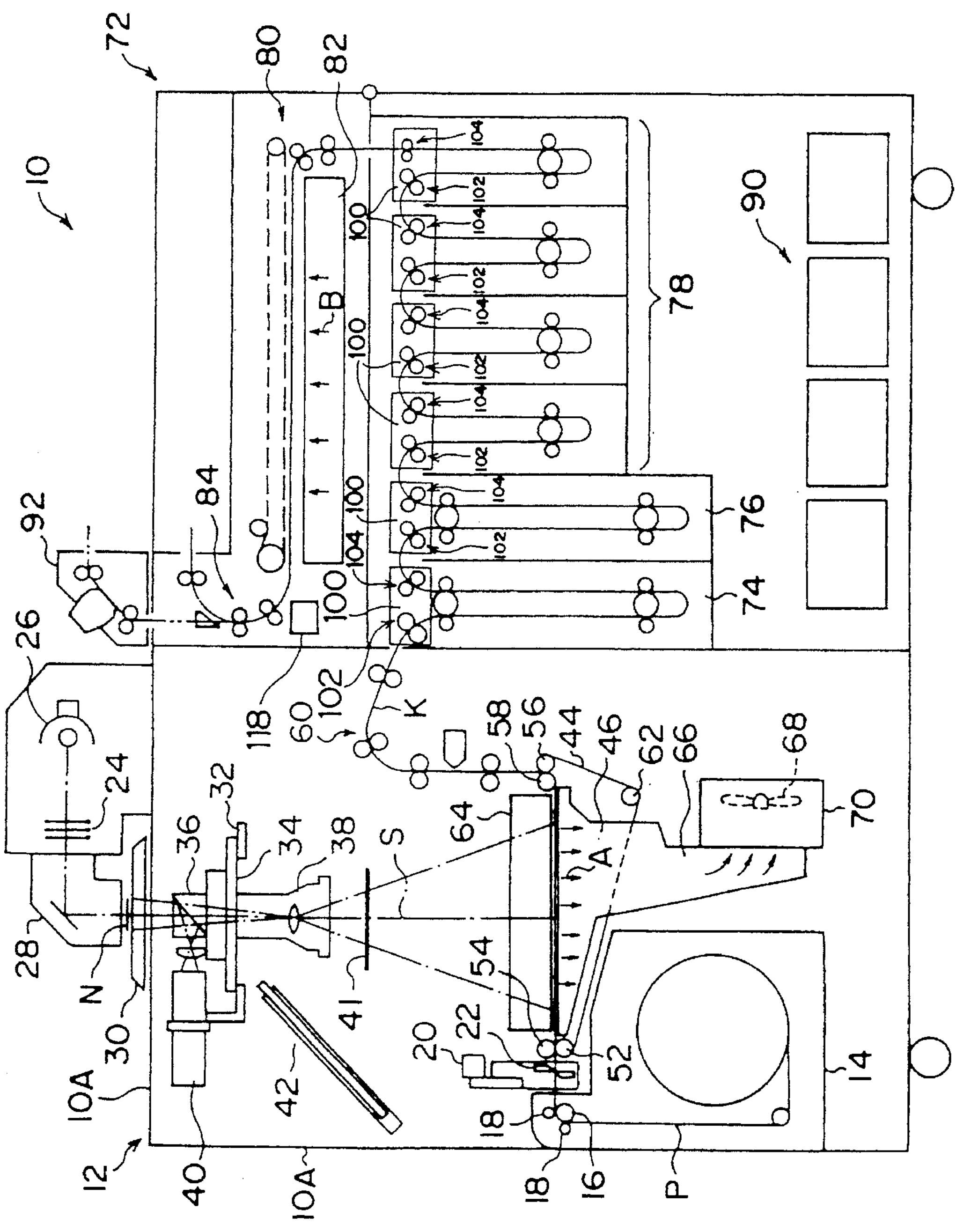
FIG. 1 is a schematic view illustrating the entire structure of a printer processor to which a condensation preventing structure for a crossover rack of an embodiment of the present invention is applied.
Figure 2:
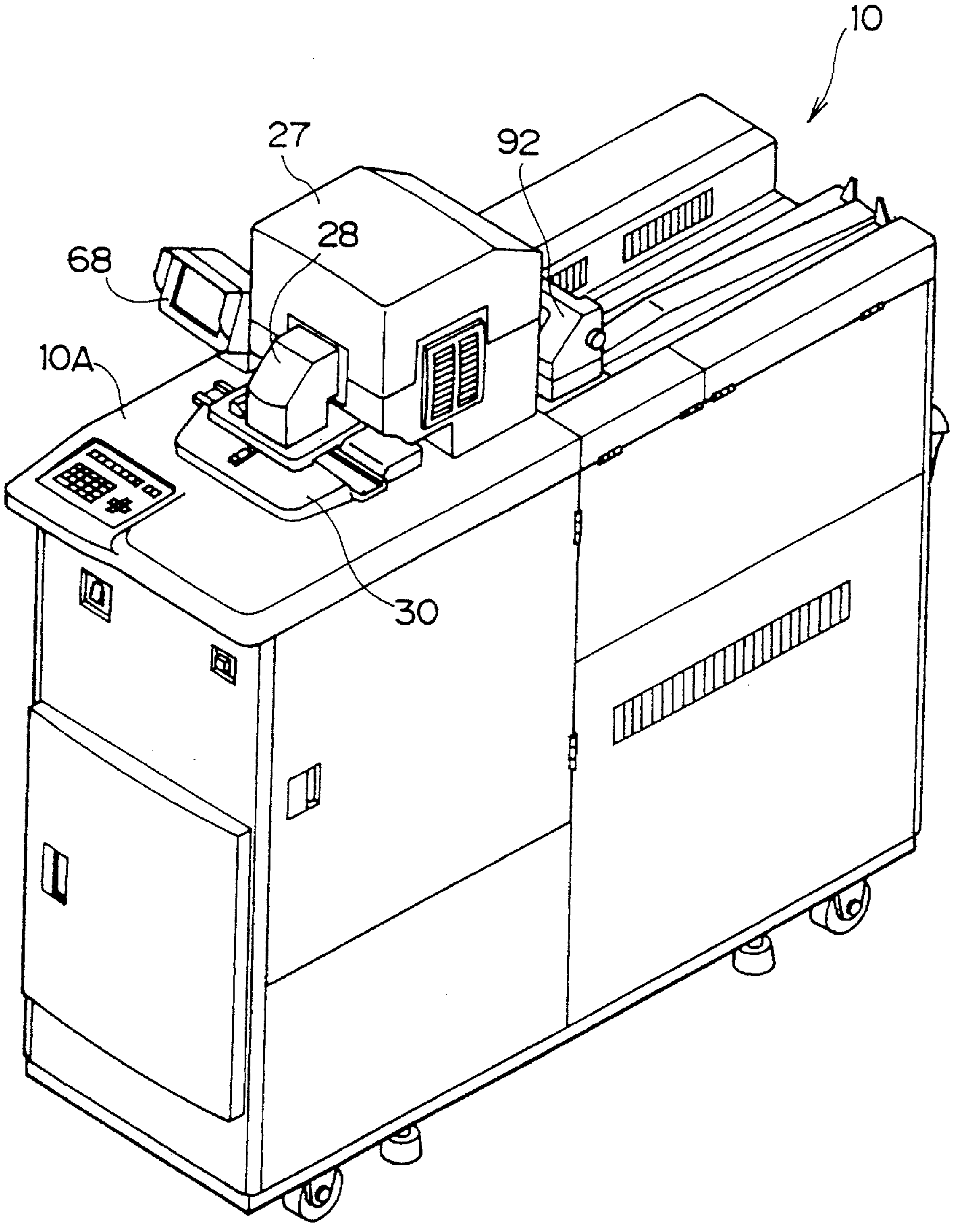
FIG. 2 is an overall perspective view of the printer processor to which the condensation preventing structure for a crossover rack of the embodiment of the present invention is applied.

FIGS. 1 and 2 roughly illustrate a printer processor 10 relating to the embodiment of the present invention. As shown in FIG. 2, the outer peripheral portion of the printer processor 10 is covered by a cover so as to be formed as a closed structure.

As illustrated in FIG. 1, a photographic printing section 12, which forms the printer section of the printer processor 10, is structured such that a paper magazine 14 which houses a photographic printing paper P can be loaded in the photographic printing section 12.

A drive roller 16, around which a vicinity of the leading end portion of the photographic printing paper P is trained, is axially supported so as to be freely rotatable at the upper left side in FIG. 1 of the paper magazine 14. The drive roller 16 receives the drive force from an unillustrated motor within the photographic printing section 12 and is rotated thereby. A pair of nip rollers 18 are disposed so as to oppose the drive roller 16 with the photographic printing paper P therebetween. As a result, the photographic printing paper P is nipped between the drive roller 16 and the nip rollers 18 and is delivered to the interior of the photographic printing section 12.

Further, a cutter 22 is disposed in the photographic printing section 12. The cutter 22 is formed from a pair of blades, one blade of the pair being located above the photographic printing paper P and one blade being located therebelow. The blades are moved by a motor 20. A predetermined length of the photographic printing paper P which has been delivered out from the paper magazine 14 is promptly cut by the cutter 22.

A supporting stand 46, whose top surface is formed along a horizontal direction (the left-right direction in FIG. 1), is disposed at the downstream side in the conveying direction of the photographic printing paper P at the right side in FIG. 1 of the cutter 22. A training roller 52, around which an endless belt 44 is trained, is disposed in a horizontal direction (the direction orthogonal to the paper surface of FIG. 1) between the supporting stand 46 and the cutter 22. A nip roller 54 is disposed above the training roller 52 such that the endless belt 44 is nipped between the nip roller 54 and the training roller 52.

A guide roller 56 around which the endless belt 44 is trained is positioned at the downstream side of the supporting stand 46 in the conveying direction of the photographic printing paper P. A presser roller 58, whose bottom surface side is disposed at substantially the same height as the top surface side of the training roller 52, is disposed at a position adjacent to the guide roller 56 at the conveying direction upstream side thereof. The presser roller 58 presses against the outer periphery of the endless belt 44.

Namely, as illustrated in FIG. 1, this portion of the endless belt 44 is formed in an S-shape. Further, the endless belt 44 is trained around a tension roller 62 beneath the guide roller 56 such that a triangular locus of movement is formed. The guide roller 56 is driven and rotated by drive force of an unillustrated motor so as to rotate the endless belt 44 in a clockwise direction in FIG. 1.

A plurality of small holes (unillustrated) are formed in the entire endless belt 44. A plurality of hole portions (unillustrated) are formed, so as to correspond to the small holes of the endless belt 44, in the top surface of the supporting stand 46 on which a portion of the endless belt 44 is disposed. The interior of the supporting stand 46 is hollow. A pair of communicating ducts 66 (only one is illustrated in the figure), which are formed so as to correspond to the transverse direction ends of the endless belt 44, are connected to the supporting stand 46. The communicating ducts 66 bypass the portion of the endless belt 44 which passes under the supporting stand 46, extend to below the endless belt 44, and are connected to a fan box 70 which is provided with a suction fan 68.

As shown in FIG. 1, an easel device 64 is provided above the portion of the endless belt 44 which portion moves on the supporting stand 46. In cases in which an image with borders is printed onto the photographic printing paper P, the periphery of the photographic printing paper P is covered by an unillustrated movable member within the easel device 64.

A diffusion box 28 which diffuses light is disposed at a position directly above the easel device 64 and at the exterior of a casing 10A which forms an outer frame of the printer processor 10. A CC filter 24 is disposed next to the diffusion box 28 at the right side thereof. The CC filter 24 is formed from three filters of C, M, Y which can move so that the respective amounts of the filters inserted into the optical path can be changed. Accordingly, after a light beam illuminated from a light source 26 positioned next to the CC Filter 24 has passed through the CC filter 24, the light beam is bent while being diffused by the diffusion box 28 and is sent downwardly. Then, the light beam passes through a negative film N on a negative carrier 30 disposed on the top surface of the casing 10A.

A supporting plate 34 is supported, so as to be movable in a horizontal direction (the direction orthogonal to the paper surface in FIG. 1), by a guide rail 32 disposed within the photographic printing section 12. A prism 36 and a zoom lens 38 are attached to the supporting plate 34 so as to be disposed on the optical axis S of the light beam.

Accordingly, the light beam, which has passed through the negative film N and has become an exposure light beam, passes through the prism 36. Thereafter, the light beam passes through the zoom lens 38 which can change the enlargement magnification, and forms the image of the negative film N on the photographic printing paper P positioned beneath the easel device 64.

A density measuring device 40, which measures the density of the negative film N and which is formed by a light sensor such as, a color filter, a CCD or the like, is disposed within the photographic printing section 12. A light beam which has been bent in the horizontal direction by the prism 36 is sent to the density measuring device 40. The density measuring device 40 is connected to an unillustrated controller and sets the exposure correction value at the time of printing exposure on the basis of the data measured by the density measuring device 40 and on the basis of data key-inputted by an operator.

A black shutter 41 is provided in the optical path between the zoom lens 38 and the easel device 64. The black shutter 41 print-exposes for a predetermined time the light whose color and intensity have been adjusted at the CC filter 24 and which has passed through the negative film N.

Because the photographic printing section 12 is structured as described above, the photographic printing paper P which is delivered in from the paper magazine 14 is cut to a desired length by the cutter 22, is placed on the endless belt 44, and is conveyed to an image printing position which is a position on the optical axis S of the exposure light beam. Then, the exposure light beam at the light source 26 side reaches the photographic printing paper P via the prism 36, the zoom lens 38 and the like. By opening the black shutter 41 for a predetermined amount of time, the image recorded on the negative film N is printed onto the photographic printing paper P. The portion of the photographic printing paper P on which the image is printed is the image portion.

At this time, the air within the supporting stand 46 is drawn out, via the communicating ducts 66, from within the loop of the endless belt 44 to the transverse direction ends, and is sucked by the suction fan 68 and blown out to the exterior. Therefore, the interior of the supporting stand 46 becomes a vacuum. The vacuum is applied to the photographic printing paper P on the endless belt 44 via the hole portions of the supporting stand 46 and the small holes of the endless belt 44, so that the photographic printing paper P is sucked to the endless belt 44 in the direction of the arrows A. As a result, the photographic printing paper P can be easily placed on the endless belt 44. Moreover, because the photographic printing paper P is sucked to the endless belt 44, the photographic printing paper P is reliably conveyed by the endless belt 44 and is disposed in a horizontal state at the image printing position.

The photographic printing paper P for which image printing has been completed is nipped between the guide roller 56 and the presser roller 58. The conveying direction thereof is changed from the horizontal direction to the vertical direction so that the photographic printing paper P is delivered in a vertical direction. Thereafter, as illustrated by a path K which shows the conveying path of the photographic printing paper P, the photographic printing paper P is conveyed, via a conveying path 60 formed by a plurality of pairs of rollers, to a processor section 72 in which developing, bleaching/fixing, washing and drying processings are effected.

Print exposure processing for one image frame of the negative film is completed by the above-described processes. By repeating these processes, photographic printing papers P, which have been subjected to print exposure processing, are conveyed to the processor section 72 successively, one at a time.

Developing solution is accumulated in a developing tank 74 within the processor section 72. The photographic printing paper P is immersed in the developing solution so that developing processing is effected. The photographic printing paper P which has been subjected to developing processing is conveyed to a bleaching/fixing tank 76 which is adjacent to the developing tank 74. Bleaching/fixing solution is accumulated in the bleaching/fixing tank 76. The photographic printing paper P is immersed in the bleaching/fixing solution so that bleaching processing and fixing processing are effected. The photographic printing paper P which has been subjected to fixing processing is conveyed to a washing section 78 which is adjacent to the bleaching/fixing tank 76 and which is formed from a plurality of washing tanks in which washing water is accumulated. The photographic printing paper P is immersed in the washing water in the washing tanks so that washing processing is effected.

Developing solution, bleaching/fixing solution and washing water are sent from a plurality of replenishing tanks 90 disposed in the processor section 72 to the developing tank 74, the bleaching/fixing tank 76, and the washing tanks 78, respectively, so that the respective solutions are replenished.

A crossover rack 100 is provided at the top portion of the developing tank 74, the bleaching/fixing tank 76, and each washing tank 78, respectively. The photographic printing paper P is successively conveyed to the adjacent processing section by the crossover racks 100. A pair of conveying rollers 102 is disposed at the entrance side of the crossover rack 100, and a pair of conveying rollers 104 is disposed at the exit side.

Figure 3:
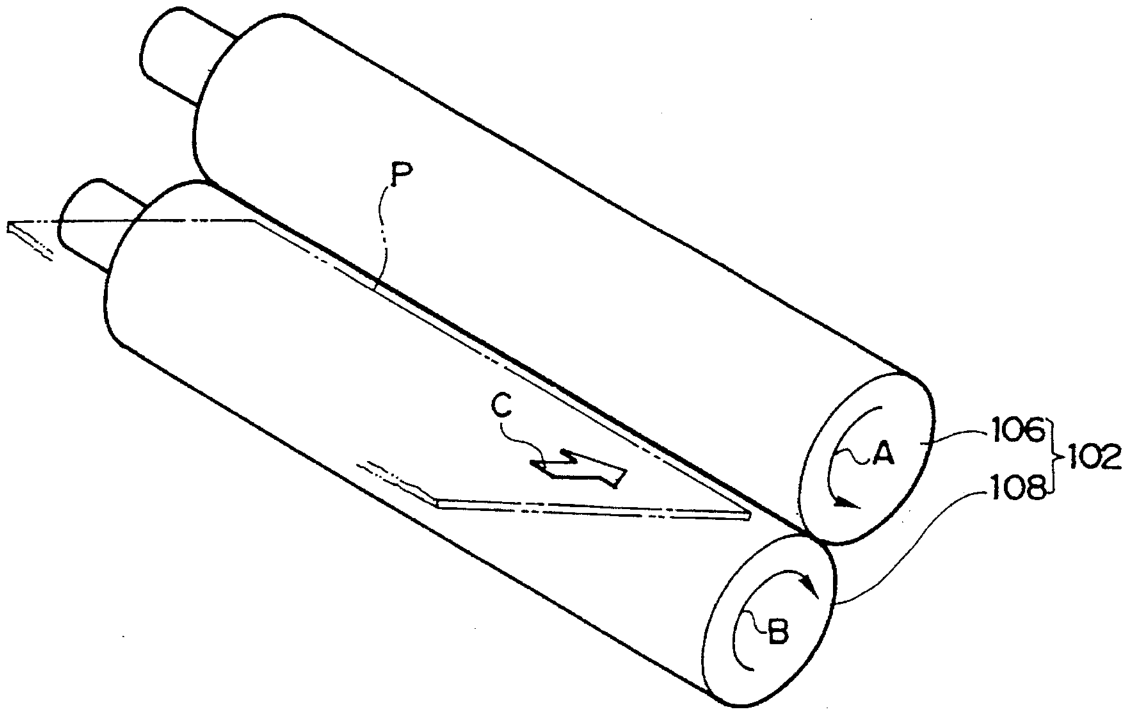
FIG. 3 is a perspective view illustrating conveying rollers of a crossover rack of the embodiment of the present invention.

As illustrated in FIG. 3, the conveying rollers 102 comprise an upper roller 106 and a lower roller 108. When the upper roller 106, which is the drive roller, rotates in the direction of arrow A in FIG. 3, the lower roller 108, which is the follower roller, rotates in the direction of arrow B in FIG. 3 so that the photographic printing paper P is nipped and conveyed in the direction of arrow C.

The conveying rollers 104 are structured in the same way as the conveying rollers 102, and description of the former is omitted.

As shown in FIG. 1, the photographic printing paper P which has been subjected to washing processing is conveyed to a drying section 80 which is positioned above the developing tank 74, the bleaching/fixing tank 76 and the washing section 78. In the drying section 80, the photographic printing paper P is exposed to warm air blown in the direction of arrows B from a chamber 82 disposed beneath the conveying path of the photographic printing paper P, so that the photographic printing paper P is dried.

The chamber 82 is disposed in a vicinity of the respective crossover racks 100. Condensation on the conveying rollers 102, 104 of the crossover racks 100 is prevented by the heat of the chamber 82. Further, when an unillustrated drying section temperature sensor detects that the temperature in a vicinity of the crossover racks 100 has become less than or equal to the temperature of the solutions in the processing tanks, the drying section 80 is heated to a predetermined temperature due to a controller 118 which serves as a control device.

A conveying path 84 formed by a plurality of pairs of rollers is disposed at the photographic printing paper P conveying direction downstream side of the drying section 80. The photographic printing paper P, for which drying processing has been completed and which has been discharged from the drying section 80, is nipped by the respective pairs of rollers, is discharged to the exterior of the printer processor 10, and is stacked on other discharged photographic printing papers P.

If the photographic printing paper P which is subject to developing, bleaching/fixing, washing and other processings is a special photographic printing paper for testing the deterioration of the developing solution, the photographic printing paper P is sent to a densitometer 92 disposed above the conveying path 84. The density of the photographic printing paper P is measured by the densitometer 92.

During print exposure processing, in a case in which special enlargement magnification which cannot be achieved by the zoom lens 38 within the photographic printing section 12 is necessary, the supporting plate 34 is moved in a horizontal direction (the direction orthogonal to the paper surface in FIG. 1), and the prism 36 and the zoom lens 38 are removed from the optical axis S. Then, an unillustrated lens is disposed on the optical axis S, and a photometric mirror 42 disposed within the photographic printing section 12 is moved onto the optical axis S.

Operation of the present embodiment will be described hereinafter.

In the printer processor 10 of the present embodiment, the chamber 82 of the drying section 80 is disposed in a vicinity of the crossover racks 100 of the respective processing tanks. Therefore, condensation on the conveying rollers 102, 104 of the crossover racks 100 can be prevented by the heat of the chamber 82.

Further, while the printer processor 10 is in an operating state or in a non-operating state (standby state), when the temperature in a vicinity of the crossover racks 100 falls to the temperature of the solutions in the processing tanks or lower, moisture condenses. Therefore, in the printer processor 10 of the present embodiment, when the temperature in a vicinity of the crossover racks 100 falls to the temperature of the solutions in the processing tanks or lower, the drying section is heated by the controller 118 to a predetermined set temperature on the basis of data regarding the temperature in a vicinity of the crossover racks 100 which temperature is detected by the drying section temperature sensor. Accordingly, condensation can be prevented.

Next, a condensation preventing structure for a crossover rack relating to another embodiment of the present invention will be described with reference to FIGS. 4 and 5. Description of parts which are the same as those of the previously-described embodiment is omitted.

Figure 4:
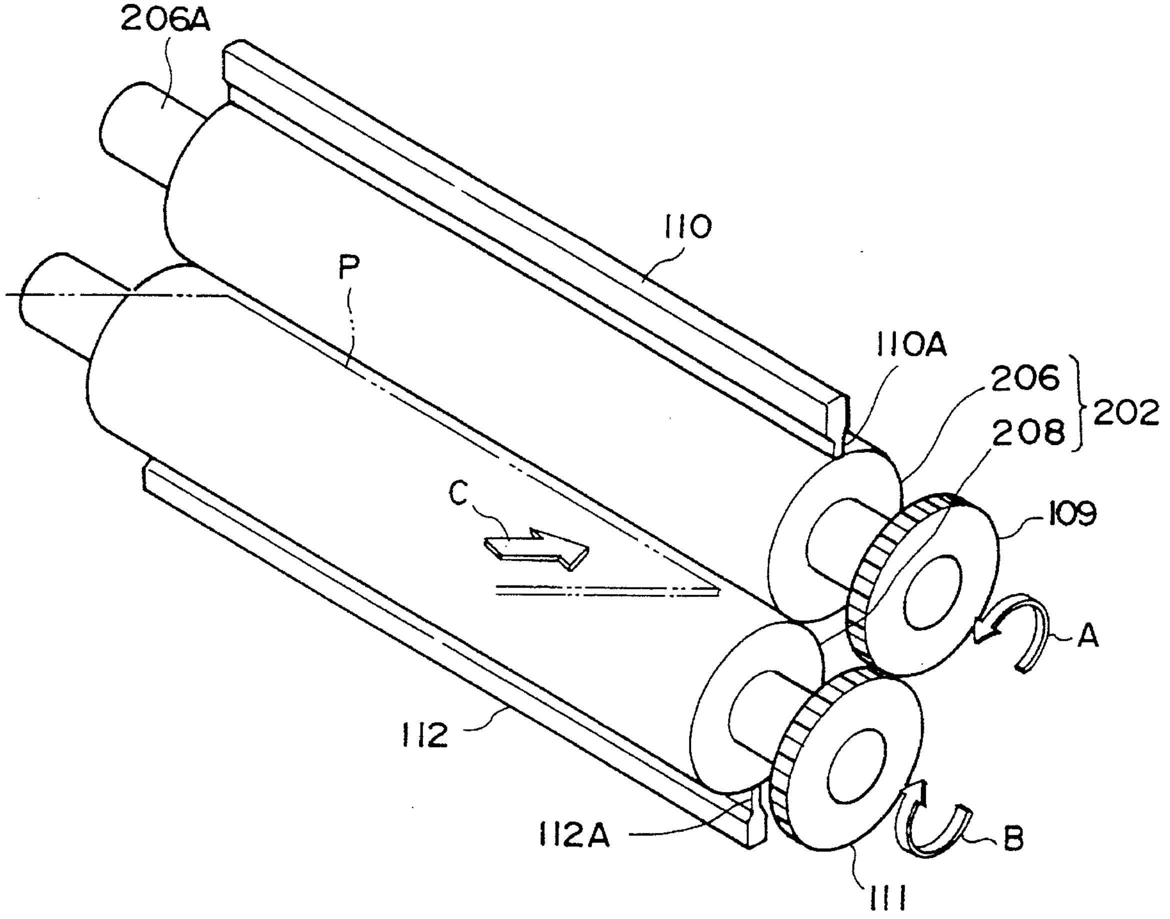
FIG. 4 is a perspective view illustrating a condensation preventing structure for a crossover rack of another embodiment of the present invention.

As illustrated in FIG. 4, conveying rollers 202 comprise an upper roller 206 and a lower roller 208. When the upper roller 206 which is the drive roller rotates in the direction of arrow A in FIG. 4, the lower roller 208 which is the follower roller rotates in the direction of arrow B in FIG. 4 via gears 109, 111 so that the photographic printing paper P is nipped and conveyed in the direction of arrow C. An upper blade 110 serving as a moisture removing device is disposed above the upper roller 206. The upper blade 110 is disposed along the axial direction of the upper roller 206, and the tip edge portion 110A of the upper blade 110 abuts the outer peripheral surface of the upper roller 206. A lower blade 112 serving as a moisture removing device is disposed below the lower roller 208. The lower blade 112 is disposed along the axial direction of the lower roller 208. The tip edge portion 112A of the lower blade 112 abuts the outer peripheral surface of the lower roller 208.

A shaft 206A of the upper roller 206 is connected to a drive motor via an unillustrated sprocket and chain. The drive motor is connected to a controller 218 (see FIG. 5) serving as a control device. Before the photographic printing paper P is conveyed by the conveying rollers 202, the controller 218 has electric power supplied to the drive motor for a fixed period of time so that the upper roller 206 and the lower roller 208 are rotated.

Further, a pair of conveying rollers 204 are disposed at the exit side of each of the crossover racks 100 of the present embodiment. The pair of conveying rollers 204 has the same structure as the conveying rollers 202, except that the conveying rollers 204 do not include the upper blade 110 and the lower blade 112 which serve as the moisture removing device. However, although the conveying rollers 204 are not provided with the upper blade 110 and the lower blade 112 in the present embodiment, the conveying rollers 204 may be provided with the blades 110, 112.

Figure 5:
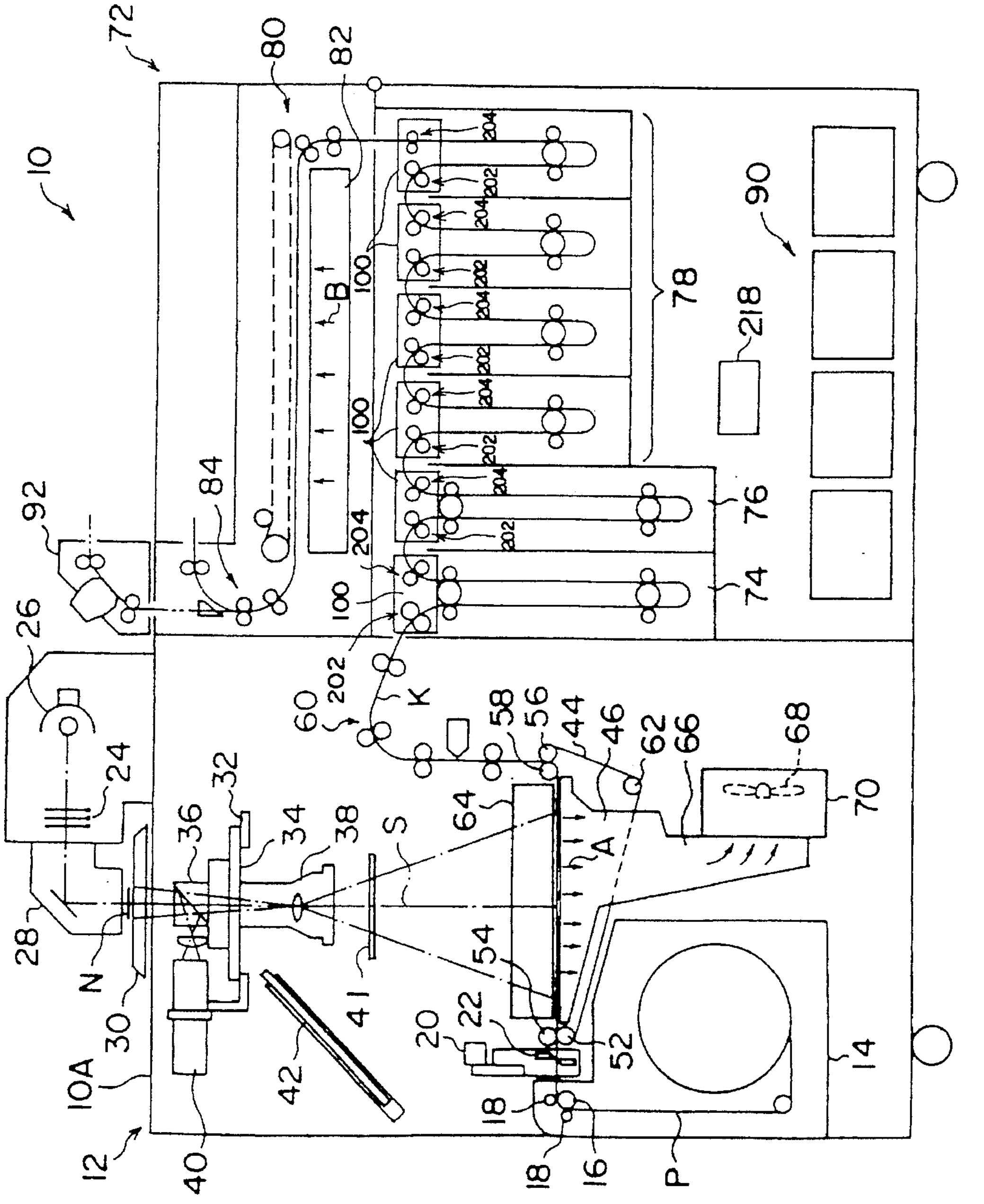
FIG. 5 is a schematic view illustrating the entire structure of a printer processor to which the condensation preventing structure for a crossover rack of the embodiment of FIG. 4 of the present invention is applied.

As illustrated in FIG. 5, the photographic printing paper P which has been subject to washing processing is conveyed to the drying section 80 positioned above the developing tank 74, the bleaching/fixing tank 76 and the washing section 78. In the drying section 80, the photographic printing paper P is exposed to warm air blown in the direction of arrows B from the chamber 82 disposed beneath the conveying path of the photographic printing paper P, so that the photographic printing paper P is dried. Thereafter, the photographic printing paper P for which drying processing has been completed is discharged from the drying section 80 in the same way as in the embodiment illustrated in FIG. 1.

Special photographic printing papers used for testing the deterioration of the developing solution are handled and printing exposure requiring special enlargement magnification is treated in the same way as in the embodiment illustrated in FIG. 1.

Operation of the present embodiment will now be described.

At the printer processor 10 of the present embodiment, before the exposed photographic printing paper P is conveyed by the conveying rollers 202 of the crossover rack 100, electric power is supplied to the drive motor for a fixed period of time due to the controller 218. The upper roller 206 and the lower roller 208 rotate, and the moisture which has condensed at the conveying rollers 202 can be removed by the upper blade 110 which abuts the outer peripheral surface of the upper roller 206 and the lower blade 112 which abuts the outer peripheral surface of the lower roller 208.

As a result, uneven development caused by moisture condensing on the conveying rollers 202 can be prevented.

Figure 6:
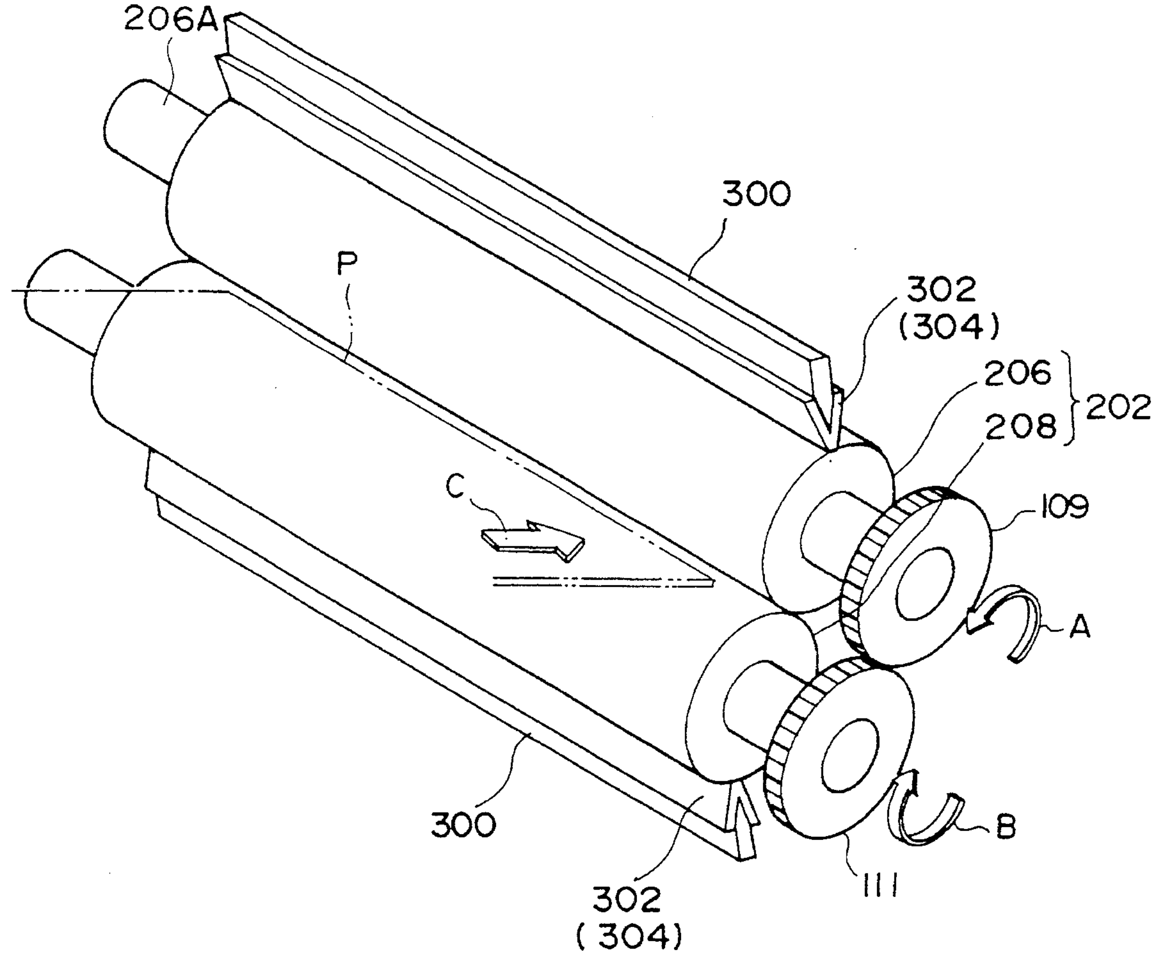
FIG. 6 is a perspective view illustrating another aspect of a condensation preventing structure for a crossover rack of the embodiment of FIG. 4 of the present invention.

In the present embodiment, the upper blade 110 and the lower blade 112 are used as the moisture removing device. However, the moisture removing device is not limited to the same, and another moisture removing device such as a moisture-absorbing fabric 302 supported by a supporting member 306, a sponge 304 supported by the supporting member 306, or the like may be used (see FIG. 6).

What is claimed is:

1. A condensation preventing structure for a crossover rack provided in a printer processor, comprising:

a plurality of conveying rollers provided at a crossover rack provided within a printer processor; and a moisture adhesion prevention and moisture removing means which prevents adhesion of moisture to said plurality of conveying rollers due to condensation and removes moisture on said plurality of conveying rollers due to condensation.

2. A condensation preventing structure for a crossover rack according to claim 1, wherein said moisture adhesion prevention/moisture removing means is a drying section provided within the printer processor, and condensation on said plurality of conveying rollers is prevented by heat generated at the drying section.

3. A condensation preventing structure for a crossover rack according to claim 1, further comprising:

a control device which permits selectively driving the drying section at all times.

4. A condensation preventing structure for a crossover rack according to claim 2, wherein the drying section is provided above the crossover rack in a vicinity thereof.

5. A condensation preventing structure for a crossover rack according to claim 3, wherein said control device heats the drying section to a predetermined temperature when a temperature in a vicinity of the crossover rack becomes less than or equal to a temperature of a solution in a processing tank provided in the printer processor.

6. A condensation preventing structure for a crossover rack according to claim 1, further comprising:

a control device which, before an exposed photographic printing paper is conveyed, drives said plurality of conveying rollers for a fixed period of time.

7. A condensation preventing structure for a crossover rack according to claim 1, wherein said moisture adhesion prevention/moisture removing means is blades or moisture-absorbing members, which abut respective peripheral surfaces of said plurality of conveying rollers.

8. A condensation preventing structure for a crossover rack according to claim 1, wherein said plurality of conveying rollers is a plurality of pairs of conveying rollers, and each pair of the plurality of pairs of conveying rollers is provided such that peripheral surfaces of the conveying rollers abut each other.

9. A condensation preventing structure for a crossover rack according to claim 8, wherein one conveying roller of each pair of the plurality of pairs of conveying rollers is a drive roller which is rotated by drive force from an exterior drive device, and the other conveying roller of each pair of the plurality of pairs of conveying rollers is a follower roller which receives drive force from the drive roller.

10. A condensation preventing structure for a crossover rack according to claim 8, wherein each pair of the plurality of pairs of conveying rollers has a gear train, and one conveying roller of each pair of the plurality of pairs of conveying rollers is rotated by drive force from an exterior drive device and transmits the drive force via the gear train to the other conveying roller of each pair of the plurality of pairs of conveying rollers.

11. A condensation preventing structure for a crossover rack provided in a printer processor, comprising:

a plurality of conveying rollers provided at a crossover rack provided within a printer processor; and a drying section provided within the printer processor; and means for preventing condensation on said plurality of conveying rollers by heat generated at said drying section.

12. A condensation preventing structure for a crossover rack according to claim 11, wherein said means for preventing condensation further comprises:

a control device which permits selectively driving the drying section at all times.

13. A condensation preventing structure for a crossover rack according to claim 12, wherein said control device heats the drying section to a predetermined temperature when a temperature in a vicinity of the crossover rack becomes less than or equal to a temperature of a solution in a processing tank provided in the printer processor.

14. A condensation preventing structure for a crossover rack according to claim 11, wherein said drying section is provided above the crossover rack in a vicinity thereof.

15. A condensation preventing structure for a crossover rack according to claim 11, wherein said plurality of conveying rollers is a plurality of pairs of conveying rollers, and each pair of the plurality of pairs of conveying rollers is provided such that peripheral surfaces of the conveying rollers abut each other.

16. A condensation preventing structure for a crossover rack according to claim 15, wherein one conveying roller of each pair of the plurality of pairs of conveying rollers is a drive roller which is rotated by drive force from an exterior drive device, and the other conveying roller of each pair of the plurality of pairs of conveying rollers is a follower roller which receives drive force from the drive roller.

17. A condensation preventing structure for a crossover rack provided in a printer processor, comprising:

a plurality of conveying rollers provided at a crossover rack provided within a printer processor;

a moisture removing means which removes moisture due to condensation on said plurality of conveying rollers; and a control device which, before an exposed photographic printing paper is conveyed, drives said plurality of conveying rollers for a fixed period of time.

18. A condensation preventing structure for a crossover rack according to claim 17, wherein said moisture removing means is blades or moisture-absorbing members, which abut respective peripheral surfaces of said plurality of conveying rollers.

19. A condensation preventing structure for a crossover rack according to claim 18, wherein said plurality of conveying rollers is a plurality of pairs of conveying rollers, and each pair of the plurality of pairs of conveying rollers is provided such that peripheral surfaces of the conveying rollers abut each other.

20. A condensation preventing structure for a crossover rack according to claim 17, wherein each pair of the plurality of pairs of conveying rollers has a gear train, and one conveying roller of each pair of the plurality of pairs of conveying rollers is rotated by drive force from an exterior drive device and transmits the drive force via the gear train to the other conveying roller of each pair of the plurality of pairs of conveying rollers.

* * * * *